3,835,110
VASOPRESSIN PEPTIDES HAVING PSYCHO-PHARMACOLOGICAL ACTIVITY

Hendrik Marie Greven, Heesch, and David de Wied, Bilthoven, Netherlands, assignors to Akzona Incorporated, Asheville, N.C.
No Drawing. Filed Jan. 29, 1973, Ser. No. 327,260
Claims priority, application Netherlands, Feb. 8, 1972, 7201604
Int. Cl. A61k 27/00; C07c 103/52
U.S. Cl. 260—112.5            4 Claims

ABSTRACT OF THE DISCLOSURE

The invention is dealing with psychopharmacologically active peptides of the formula:

H-L-Cys-L-Tyr-L-Phe-L-Glu(X)-L-Asp(X)-OH in which X represents a hydroxy or amino group, or the dimers (via S—S bridge) formed from these pentapeptides by oxidation, as well as the functional derivatives thereof.

These substances can be used as anti-depressant agents and more particularly for the treatment of certain mental disorders, whereby a stimulation of the mental performance is desired, such as in certain types of neurosis and in old-age infirmities (senility).

---

The present invention relates to peptides having psychopharmacological properties.

From Neuropharmacol 157, 4, (1965), it is known that in hypophysectomized or posterior lobectomized rats the nonapeptide derivatives (Lys)-vasopressin-zinc tannate possesses certain psychopharmacological properties. This nona-peptide proved specifically to inhibit the extinction of the conditioned avoidance response. The very high pressor activity of vasopressin and its functional derivatives is, however, a very unpleasant side-effect.

Surprisingly it has now been found that pentapeptides of the general formula:

H-L-Cys-L-Tyr-L-Phe-L-Glu(X)-L-Asp(X)-OH    I in which X represents a hydroxy or amino group, or the dimers formed from the pentapeptide by oxidation (S—S bridge), as well as the functional derivatives thereof, inhibit the extinction of the conditioned avoidance response at least to an equally strong level, but show no pressor activity.

The peptides according to the invention are prepared by a process commonly used for such compounds. The processes that are employed most for the manufacture of the present compounds, can be summarized as follows:

(a) condensation of a compound (amino acid, peptide) having a free carboxyl group and protected other reactive groups with a compound (amino acid, peptide) having a free amino group and protected other reactive groups, in the presence of a condensation agent;

(b) condensation of a compound (amino acid, peptide) having an activated carboxyl group and optionally protected other reactive groups, with a compound (amino acid, peptide) having a free NH₂ group and protected other reactive groups;

(c) condensation of a compound (amino acid, peptide) having a free carboxyl group and protected other reactive groups with a compound (amino acid, peptide) having an activated amino group and optionally protected other reactive groups, after which the protecting groups are removed, if desired.

Activation of the carboxyl group can be effected, for example, by converting the carboxyl group into an acid halide, an azide, an anhydride, an imidazolide, or an activated ester such as the N-hydroxy-succinimide ester, and the p-nitrophenyl ester.

The amino group can be activated by converting it into a phosphite amide or by the "phosphor-azo" method.

The most conventional methods for the above condensation reactions are: the carbodiimide method, the azide method, the mixed anhydride method and the method of the activated esters as described in "The Peptides," vol. I, 1965 (Academic Press), by E. Schröder and K. Lübke. Further Merrifield's "Solid Phase" method, described in J. Am. Chem. Soc. 85, 2149 (1963), can be used for the preparation of the present peptides and peptide derivatives.

The reactive groups that may not participate in the condensation reaction are protected effectively by the so-called protecting groups, which can be easily removed again, for example, by hydrolysis or reduction. Thus, for example, a carboxyl group can be protected effectively by esterification with methanol, ethanol, tertiary butanol, benzylalcohol or p-nitrobenzylalcohol, or by conversion into an amide. This latter protecting group, however, is very hard to remove so that it is recommendable to use this group only to protect the carboxyl group of the C-terminal amino acid in the ultimate peptide. In this case the peptide synthesis leads direct to the amide of the peptide according to the general formula I.

Groups that are capable of protecting an amino group effectively are usually acid groups, for example an acid group derived from an aliphatic, aromatic, araliphatic or heterocyclic carboxylic acid such as acetic acid, benzoic acid, pyridine carboxylic acid, or an acid group derived from carbonic acid such as ethoxy-carbonyl, benzyloxy-carbonyl, t-butyloxy-carbonyl or p-methyloxy-benzyloxy-carbonyl, or an acid group derived from a sulfonic acid such as benzene-sulfonyl or p-toluene-sulfonyl, but also other groups can be employed, such as substituted or unsubstituted aryl or aralkyl groups, for example, benzyl and triphenyl-methyl, or groups such as ortho-nitro-phenylsulfenyl or 2-benzoyl-1-methylvinyl.

The mercapto group of cysteine can for example be protected effectively by acylation or (ar)alkylation. Acyl groups that are often employed to protect the mercapto group are the acetyl and benzyl groups. (Ar)alkyl groups that are often employed are the tertiary butyl group, the benzyl, p-nitrobenzyl and trityl groups. It is also possible to employ the acetamido-methyl group for the temporary protection of the thiol function. Although not strictly necessary, it may sometimes be recommendable to protect the hydroxyl group of tyrosine as well. This group is preferably protected by a tertiary butyl group.

The protecting groups can be removed successively or simultaneously by various conventional methods, dependent upon the nature of the relative group, for example with trifluoro acetic acid or HF, or by mild reduction, for example with hydrogen and a catalyst such as palladium, or with HBr in glacial acetic acid, etc.

The (monomeric) peptide can be converted, if desired, into its dimer by oxidation of the mercapto groups of two monomeric peptide molecules to a disulphide. This oxidation is performed by a process commonly used for similar oxidation, for example by oxidation with potassium ferrocyanide, iodine or ethyl-diiodide, or by oxidation with air or oxygen in water or liquid ammonia. Usually this oxidation is carried out with the peptide at least deprotected from its S-protecting group. If a suitable group is chosen, it is possible, however, to carry out the oxidation on the still S-protected peptide. For example, by treating an S-trityl peptide with iodine in a suitable solvent such as methanol, the trityl group is split off, the resulting SH group being oxidized simultaneously to a disulphide bridge.

By functional derivatives of the peptides and the dimers thereof according to the invention are meant:

1. pharmaceutically acceptable acid addition salts of the peptides;
2. peptides whereby one or more free amino groups have been substituted by an acyl group derived from an aliphatic carboxylic acid with 1–6 carbon atoms, especially the acetyl group;
3. unsubstituted amides or alkyl-substituted amides of the peptides, the alkyl group of which possesses 1–6 carbon atoms, such as a —$NHCH_3$, $N(CH_3)_2$ or —$N(C_2H_5)_2$ moiety;
4. esters of the peptides derived from aliphatic or aralipathic alcohols with 1–18 carbon atoms, such as methanol, ethanol, pentanol, hexanol, cyclohexanol, octylalcohol, undecyl alcohol, hexadecyl alcohol, oleyl alcohol, octadecyl alcohol, benzyl alcohol, phenylethyl alcohol, phenylpropyl alcohol or cinnamyl alcohol;
5. metal complexes formed by contacting the peptides with a sparingly soluble salt, hydroxide or oxide of a metal, preferably zinc, or a mixture of the present peptides with a polymeric substance such as gelatin, to obtain a prolonged action.

The acid addition salts are obtained by reacting the present peptides with a pharmaceutically acceptable acid such as hydrocarbon halide, phosphoric acid, acetic acid, maleic acid, tartaric acid and citric acid.

As already briefly said before the present peptides and the functional derivatives thereof have valuable psychopharmacological activities. The present peptides inhibit the extinction of conditioned avoidance response, which means that they can generally be used as anti-depressant agents. More particularly they can be used for the treatment of certain mental disorders whereby a stimulation of the mental performance is desired, such as in certain types of neurosis and in old-age infirmities (senility).

The peptides according to the invention and the derivatives defined above can be administered orally, parenterally or intranasally. Preferably the peptides are employed as an injection preparation, for which purpose they are dissolved, suspended or emulsified in a suitable liquid, but mixed with suitable auxiliaries and fillers they can also be made up in a form suitable for oral administration, such as pills, tablets and coated tablets. The present peptides can also be administered in the form of suppositories or sprays.

The peptides are preferably administered in daily dosages of from 0.001 to 1 mg. per kg. body weight, dependent upon the form in which they are administered. Exceedingly valuable preparations are obtained if the present peptides are made up in a form in which they have a prolonged activity, for example, incorporated in gelatin or preferably as metal complexes. These metal complexes can be obtained by contacting the peptides with sparingly soluble metal salts, metal hydroxides or metal oxides. As sparingly soluble metal salts the metal phosphates, metal pyrophosphates and metal polyphosphates are usually used.

Metals that can be used in this process are the metals belonging to the b-groups of the periodic system, for example cobalt, nickel, copper, iron, and preferably zinc, as well as the metals belonging to the main groups of the periodic system and capable of forming complexes, such as magnesium and aluminium.

The preparation of the said metal complexes takes place in a conventional manner. They can be obtained by adding the peptide and a sparingly soluble metal salt, metal hydroxide or metal oxide to an aqueous medium. They can also be obtained by adding an alkaline medium to an aqueous solution of the peptide and an insoluble metal salt to form the insoluble peptide-metal hydroxide complex. Moreover, the metal complexes can be obtained by adding the peptide, a soluble metal salt and a soluble salt to an aqueous, preferably alkaline medium to obtain the insoluble peptide-metal salt complex in situ.

The metal complexes can be employed at once, or, for example, be lyophilized and suspended again afterwards.

BIOLOGICAL ACTIVITY (a) Pole-jumping test (active avoidance test)

Male white rats, weighing about 125 gm., were conditioned by means of the so-called pole-jumping test. The conditioned stimulus was a light presented over the cage, followed after 5 seconds by the unconditioned stimulus of shock through the grid floor of the cage.

For 3 consecutive days 10 trials were run each day with an average interval of 60 seconds. After this acquisition period the extinction was studied for 3 consecutive days. All the animals that made 8 or more responses in the first extinction session were treated with the substance or placebo to be tested, and 24 and 48 hours later again subjected to an extinction session of 10 trials.

The number of positive responses (10 at the most), as compared with the results with a placebo, is a measure for the degree in which the extinction of learning and behaviour is inhibited.

| Substance | Acquisition period (total 30 trials) average number of responses per rat | Average number of responses per rat in a session of 10 trials | |
|---|---|---|---|
| | | 24 hours after treatment | 48 hours after treatment |
| Placebo | 15 | 8 | 1 |
| Pentapeptide dimer (1 μgm. subc.) [1] | 16.5 | 9 | 8 |

[1] The pentapeptide dimer is the peptide prepared in Example F.1.

(b) Passive avoidance" test

The experimental set-up consisted of an elevated runway connected with a dark chamber by a door. The elevated runway was lit with a 15 w. lamp, fitted about 40 cm. above the center of the elevated runway. The floor of the dark chamber consisted of a metal grid through which an electric shock could be delivered to rats confined in the chamber.

On the first day of the trial male white rats, weighing 180–200 gm., were placed in the dark chamber for 2 minutes (each rat separately). Then followed a trial in which the rat was placed on the lit elevated runway and allowed to enter the dark chamber, after which the guillotine door was closed.

On the second trial day the latter trial was repeated 3× with an interval of about 2 minutes. On the last day of the 3 successive trials the rat received an electric shock immediately after entering the chamber. The rat was then treated with the substance to be tested and after 24 and 48 hours again subjected to a trial without an electric shock having been delivered. A note was made of the time when the rat was placed on the elevated runway and of the time when the animal entered the dark chamber. A length of time of 300 seconds was taken as the maximum observation time per rat.

| Substance | Dosage, μg. | Median of the length of time per rat of three "pre-shock" trials in seconds | Median of the length of time per rat in a "post-shock" trial in seconds | |
|---|---|---|---|---|
| | | | 24 hours after treatment | 48 hours after treatment |
| Placebo | 1 | 3 | 11 | 5 |
| Lysin vasopressin | 1 | 6 | 300 | 287 |
| | 0.25 | 5 | 190 | 127 |
| | 0.0625 | 5 | 13 | 8 |
| Pentapeptide dimer [1] | 0.5 | 5 | 300 | 297 |
| | 0.125 | 6 | 212 | 193 |
| | 0.03125 | 6 | 36 | 25 |

[1] The pentapeptide dimer is the peptide prepared in example F.1.

The above table shows that lysine-vasopressin and the pentapeptide-dimer both strongly inhibit the extinction of learning and behaviour. From a comparison of the dosages it may be concluded that the dimer-peptide is more than twice as active in this respect as the lysine-vasopressin.

With regard to the examples and claims the following remarks are made:

(I) If no optical configuration is mentioned the L-form is meant.

(II) As protecting groups the following groups have been used in the examples:

Z=benzyloxycarbonyl
Boc=tertiary-butyloxy carbonyl
tBu=tertiary-butyl
Me=methyl
ONP=p-nitrophenyl
Bzl=benzyl
Tos=tosyl (III) For the solvents or reagents employed the following abbreviations have been used in the examples:

Bz=benzene
Bu=butanol
Py=pyridin
Ac=acetic acid
Wa=water
Am=amyl alcohol
DMF=dimethylformamide
THF=tetrahydrofuran
DCCI=dicyclohexylcarbodi-imid
DCCU=dicyclohexylurea (IV) For the amino acid groups the following abbreviations have been used:

Cys=cysteinyl
Tyr=tyrosyl
Phe=phenylalanyl
Glu(X)=glutamyl (X=OH)
Glu(X)=glutaminyl (X=NH$_2$)
Asp(X)=aspartyl (X=OH)
Asp(X)=asparaginyl (X=NH$_2$)

Cys
 |  =cystinyl
Cys

EXAMPLE 1

A.1 Z-Cys(Bzl)-Tyr-OMe

Z-Cys(Bzl)-OH (14 gm.) is dissolved in 60 ml. of purified DMF, after which 8 gm. of H-Tyr-OMe are added. This suspension is cooled down to 0° C., after which 8.4 gm. of DCCl are added. Then the temperature is allowed to rise to about 20° C., while stirring. After that stirring is continued for 20 hours. The resulting DCCU is filtered off and the filtrate is then evaporated in vacuum and the residue dissolved in ethyl acetate/water. The organic phase is washed with 0.1 N hydrochloric acid, water, 5% sodium bicarbonate and water, whereupon the ethyl acetate is dried and distilled off in vacuum. The residue is crystallized from ethyl acetate-petroleumether. Yield: 18.1 gm.; melting point: 92–96° C.

A.2. Z-Cys(Bzl)-Tyr-OH

Of the above compound 8 gm. is dissolved in 20 ml. of methanol to which two equiv. of sodium hydroxide have been added. After 1 hour's stirring at room temperature, the solution is acidified to pH 3 and diluted with 20 ml. of water. After 1 hour's stirring at 0° C., the precipitate is filtered off. Yield: 6.2. gm.; melting point: 200–203° C. Rf in Bz:EtOH (8:2)=0.10 (SiO$_2$).

B.1. H-Glu(NH$_2$)-Asp(OBzl)-OBzl.HCl

Boc-Glu(NH$_2$)-ONP (3.67 gm.) and 3.13 gm. of H-Asp(OBzl)-OBzl are dissolved in 25 ml. of dimethylformamide. The reaction mixture is stirred for 8 hours at 0° C. and then for another 40 hours at room temperature. The solvent is evaporated in vacuum and the residue taken up in moist ethyl acetate, washed with water, 5% sodium bicarbonate and water, after which the ethylacetate is distilled off in vacuum. The resulting oil is dissolved in dry methylene-chloride, after which dry hydrogen-chloride gas is bubbled through for 1 hour. The dipeptide precipitates during this process and can be isolated by filtration. Yield: 2.7 gm.; melting point: 170° dec. Rf in Am:Py:Wa (5:3:2)=0.37 (SiO$_2$).

B.2. H-Glu(OBzl)-Asp(OBzl)-OBzl.HCl

In the same manner as in B.1. Boc-Glu(OBzl)-ONP is coupled to H-Asp(OBzl)-OBzl, and then freed from the tertiary butyloxycarbonyl group. Rf in Am:Py:Wa (5:3:2)=0.43 (SiO$_2$).

B.3. H-Glu(OBzl)-Asp(NHCH$_3$)-OBzl.HCl

In the same manner as in B.1. Boc-Glu(OBzl)-ONP is coupled to H-Asp(NHCH$_3$)-OBzl, after which the Boc group is removed. Rf in Am:Py:Wa (5:3:2)=0.39 (SiO$_2$).

B.4. H-Glu(OBzl)-Asp(NH$_2$)-OBzl.HCl

In the same manner as in B.1. Boc-Glu(OBzl)-ONP is coupled to H-Asp(NH$_2$)-OBzl, after which the Boc group is removed. Rf in Am:Py:Wa (5:3:2)=0.38 (SiO$_2$).

B.5. H-Glu(NH$_2$)-Asp(OBzl)-NR$_1$R$_2$.HCl (R$_1$, R$_2$=hydrogen or methyl)

In the same manner as in B.1. Boc-Glu(NH$_2$)-ONP is coupled to H-Asp(OBzl)-NR$_1$R$_2$ after which the Boc group is removed. Rf in Am:Py:Wa (5:3:2)=0.34 (SiO$_2$) (for R$_1$ and R$_2$=H) and 0.36 for R$_1$ and R$_2$=methyl.

B.6. H-Glu(NH$_2$)-Asp(OBzl)-OR.HCl (R=CH$_3$ or —C$_{11}$H$_{23}$)

In the same manner as in B.1. Boc-Glu(NH$_2$)-ONP is coupled to H-Asp(OBzl)-OR (R=CH$_3$ or —C$_{11}$H$_{23}$), after which the Boc group is removed.

C.1. H-Phe-Glu(NH$_2$)-Asp(NH$_2$)-OH

Tos-Phe-Glu(NH$_2$)-Asp(NH$_2$)-OH (3.8 gm.—J.A.C.S. 76, 6202, 1954) is dissolved in 100 ml. of dry ammonia. Then sodium is added till the blue colouring persists, after which the solution is stirred, whereupon the colour is removed by the addition of ammonium chloride. The ammonia is allowed to escape in the air, after which the residue is taken up in water and extracted with ether. The aqueous phase is lyophilized. The residue is taken up in water, and the solution diluted with pure alcohol. The resulting precipitate is filtered off and then dried over phosphorous pentoxide. Yield: 2.6 gm.; melting point: 227° C. (dec.). Rf in Bu:Py:Ac:Wa (4:3/4:1/4:1)=0.15.

C.2. H-Phe-Glu(NH$_2$)-Asp(OH)-OH

Z-Phe-ONP, (2.1 gm.), dissolved in 25 ml. of ethylacetate, and 2.4 gm. of H-Glu(NH$_2$)-Asp(OBzl)-OBzl (freed from the hydrochloride obtained according to example B.1.), dissolved in 10 ml. of DMF, are mixed and stirred for 20 hours at 0° C. The resulting precipitate is filtered off, washed with dry ethyl-acetate and dried. Melting point: 170–173° C. Rf in Bz:EtOH (8:2)=0.74 (SiO$_2$).

Of this protected peptide 2.9 gm. are dissolved in 35 ml. of glacial acetic acid, after which 10% palladium/charcoal is added and hydrogen is bubbled through. After removal of the solvent by evaporation the residue is taken up in water and lyophilized. Rf in Am:Py:Wa (5:3:2) 0.14 (SiO$_2$).

C.3. In the same manner as described in example C.2. Z-Phe-ONP is coupled to the peptides obtained in B.2., 3, 4, 5 and 6, and after that deprotected.

| Peptide: | Rf in Am:Py:Wa (5:3:2) |
|---|---|
| C.3.1 H-Phe-Glu(OH)-Asp(OH)-OH | 0.12 |
| C.3.2. H-Phe-Glu(OH)-Asp(NHCH$_3$)-OH | 0.15 |
| C.3.3. H-Phe-Glu(OH)-Asp(NH$_2$)-OH | 0.15 |
| C.3.4. H-Phe-Glu(NH$_2$)-Asp(OH)-NH$_2$ | 0.17 |
| C.3.5. H-Phe-Glu(NH$_2$)-Asp(OH)-N(CH$_3$)$_2$ | 0.19 |
| C.3.6. H-Phe-Glu(NH$_2$)-Asp(OH)-OCH$_3$ | 0.22 |
| C.3.7. H-Phe-Glu(NH$_2$)-Asp(OH)-OC$_{11}$H$_{23}$ | 0.24 |

D.1. Z-Cys(Bzl)-Tyr-Phe-Glu(NH$_2$)-Asp(NH$_2$)-OH

To 1 gm. of Z-Cys(Bzl)-Tyr-OH (example A.2.), dissolved in 10 ml. of THF, is added 0.26 ml. of N-ethylmorpholine, after which the solution is cooled down to −10° C., and 0.26 ml. of isobutyl chloroformate is added. The solution is stirred for 10 minutes at −10° C., after which 0.8 gm. of H-Phe-Glu(NH$_2$)-Asp(NH$_2$)-OH (example C.1.) and 0.26 ml. of N-ethylmorpholine in 10 ml. of cooled DMF are added. The reaction mixture is stirred for 30 minutes at −10° C., for 2 hours at 0° C. and for 18 hours at 20° C., after which it is poured into water and the pH adjusted to 3–4, whereupon the solid substance formed is removed by centrifugation.

The thus-obtained product is recrystallized from ethanol/water (1:1). Melting point: 219° C. (dec.). Rf in Bu:Py:Ac:Wa (4:3/4:1/4:1)=0.44 on SiO$_2$.

D.2. Z-Cys(Bzl)-Tyr-Phe-Glu(NH$_2$)-Asp(OH)-OH

In the same manner as described in example D.1. 1 gm. of the dipeptide Z-Cys(Bzl)-Tyr-OH is converted into the mixed anhydride. To this anhydride a solution is added of 0.80 gm. of H-Phe-Glu(NH$_2$)-Asp(OH)-OH (example C.2.) and 0.52 ml. of N-ethylmorpholine in DMF. Yield after processing the reaction mixture as described: 1.3 gm. Rf in Bu:Py:Ac:Wa (4:3/4:1/4:1)=0.44 on SiO$_2$.

In the same manner as described in D.1. and D.2. the following peptides are prepared by coupling Z-Cys (Bzl)-Tyr-OH to the peptides mentioned in C.3.

| | Rf in Bu:Py:Ac:Wa (4:3/4:1/4:1) |
|---|---|
| D.3.1. Z-Cys(Bzl)-Tyr-Phe - Glu(OH)-Asp(OH)-OH | 0.24 |
| D.3.2. Z-Cys(Bzl)-Tyr-Phe - Glu(OH)-Asp(NH$_2$)-OH | 0.34 |
| D.3.3. Z-Cys(Bzl)-Tyr-Phe-Glu(OH)-Asp(NHCH$_3$)-OH | 0.34 |
| D.3.4. Z-Cys(Bzl)-Tyr-Phe - Glu(NH$_2$)-Asp(OH)-NH$_2$ | 0.40 |
| D.3.5. Z-Cys(Bzl)-Tyr-Phe - Glu(NH$_2$)-Asp(OH)-N(CH$_3$)$_2$ | 0.45 |
| D.3.6. Z-Cys(Bzl)-Tyr-Phe - Glu(NH$_2$)-Asp(OH)-OCH$_3$ | 0.52 |
| D.3.7. Z-Cys(Bzl)-Tyr-Phe - Glu(NH$_2$)-Asp(OH)-OC$_{11}$H$_{23}$ | 0.58 |

E. Deprotection of the pentapeptides obtained in D.

Of a pentapeptide obtained according to example D. 100 mg. are dissolved in 50 ml. of dry liquid ammonia in oxygen free nitrogen atmosphere. To this solution sodium is added till a blue colouring persists, which colour is removed by the addition of ammonium-chloride, after which the ammonia is allowed to escape in the air. The remaining residue, still under oxygen-free nitrogen, is taken up in 50 ml. of oxygen-free HCl (0.02 N), 10 ml. of which are then lyophilized. The residue thereof should be stored under nitrogen atmosphere.

Prepared in this manner the HCl salts of:

| | Rf in Bu:Py:Ac:Wa (4:3/4:1/4:1) |
|---|---|
| E.1. H-Cys-Tyr-Phe-Glu(NH$_2$)-Asp(NH$_2$)-OH | 0.13 |
| E.2. H-Cys-Tyr-Phe-Glu(NH$_2$)-Asp(OH) - OH | 0.10 |
| E.3. H-Cys-Tyr-Phe-Glu(OH)-Asp(OH)-OH | 0.08 |
| E.4. H-Cys-Tyr-Phe-Glu(OH)-Asp(NH$_2$) - OH | 0.10 |
| E.5. H-Cys-Tyr-Phe-Glu(OH)-Asp(NHCH$_3$)-OH | 0.10 |
| E.6. H-Cys-Tyr-Phe-Glu(NH$_2$)-Asp(OH)-NH$_2$ | 0.12 |
| E.7. H-Cys-Tyr-Phe-Glu(NH$_2$)-Asp(OH)-N(CH$_3$)$_2$ | 0.12 |
| E.8. H-Cys-Tyr-Phe-Glu(NH$_2$)-Asp(OH)-OCH$_3$ | 0.14 |
| E.9. H-Cys-Tyr-Phe-Glu(NH$_2$)-Asp(OH)-OC$_{11}$H$_{23}$ | 0.15 |

F. Dimers of the pentapeptides obtained in E.

The remaining 40 ml. of the pentapeptide solution obtained in example E., is used further for the conversion of the pentapeptide into its dimer form. These dimers are obtained by oxidation of 2 molecules of the pentapeptide whereby the two SH groups are oxidized to an S—S bridge.

The pH of the 40 ml. solution is adjusted to 6.6, after which air is bubbled through until neutral reaction on SH groups, whereby the pentapeptide is converted into its dimer. The solution is then readjusted to pH 4 with acetic acid, after which the mixture is lyophilized. The resulting substance is stirred into a little cold water, during which process the (anorganic) salts dissolve, but the dimeric peptide does not. After filtration the solid substance is dried. The dimers of the following pentapeptides are obtained:

| | Rf in Bu:Py:Ac:Wa (4:3/4:1/4:1) |
|---|---|
| F.1. H-Cys-Tyr-Phe-Glu(NH$_2$)-Asp(NH$_2$)-OH | 0.15 |
| F.2. H-Cys-Tyr-Phe-Glu(NH$_2$)-Asp(OH)-OH | 0.10 |
| F.3. H-Cys-Tyr-Phe-Glu(OH)-Asp(OH)-OH | 0.08 |
| F.4. H-Cys-Tyr-Phe-Glu(OH)-Asp(NH$_2$)-OH | 0.13 |
| F.5. H-Cys-Tyr-Phe-Glu(OH)-Asp(NHCH$_3$)-OH | 0.13 |
| F.6. H-Cys-Tyr-Phe-Glu(NH$_2$)-Asp(OH)-NH$_2$ | 0.16 |
| F.7. H-Cys-Tyr-Phe-Glu(NH$_2$)-Asp(OH)-N(CH$_3$)$_2$ | 0.16 |
| F.8. H-Cys-Tyr-Phe-Glu(NH$_2$)-Asp(OH)-OCH$_3$ | 0.16 |
| F.9. H-Cys-Tyr-Phe-Glu(NH$_2$)-Asp(OH)-OC$_{11}$H$_{23}$ | 0.18 |

EXAMPLE II

A. A preparation for oral administration of the following composition is prepared:

| | Mg |
|---|---|
| Pentapeptide dimer prepared in example F.1. | 0.5 |
| Sorbitol | 200 |
| Sodium benzoate | 1 |

Ethanol 100%, 0.05 ml
Water (distilled and pyrogen-free) to 1 ml.

B. A preparation for injection purposes of the following composition is prepared:

| | Mg |
|---|---|
| Pentapeptide-dimer prepared in example F.1. | 1.0 |
| NaCl | 9.0 |
| Methyloxybenzoate | 1.2 |

Distilled, pyrogen-free water to 1.0 ml.

C. A basic granulate is prepared consisting of:

| | Mg |
|---|---|
| Carboxymethylcellulose | 2.5 |
| Starch | 20.0 |
| Lactose | 68.5 |

This granulate is mixed up with 7.5 mg. of the pentapeptide dimer prepared in F.3., 1 mg. of talc and 0.5 mg. of magnesium stearate, after which the mixture is compressed into a 100 mg. tablet.

What is claimed is:

1. A peptide of the formula:

H-Cys-Tyr-Phe-X-Y-OH in which X is selected from the group consisting of Glu and Gln and Y is selected from the group consisting of Asp and Asn, and functional derivatives thereof selected from the group consisting of pharmaceutically acceptable salts, N-terminal acyl derivatives derived from an aliphatic carboxylic acid with 1–6 carbon atoms, C-terminal unsubstituted or alkyl-substituted amides the alkyl group of which contains 1–6 carbon atoms, and C-terminal esters derived from aliphatic or araliphatic alcohols with 1–18 carbon atoms.

2. A peptide of the formula:

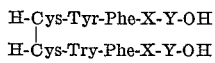

in which X is selected from the group consisting of Glu and Gln and Y is selected from the group consisting of Asp and Asn, and functional derivatives thereof selected from the group consisting of pharmaceutically acceptable salts, N-terminal acyl derivatives derived from an aliphatic carboxylic acid with 1–6 carbon atoms, C-terminal unsubstituted or alkyl-substituted amides the alkyl group of which contains 1–6 carbon atoms, and C-terminal esters derived from aliphatic or araliphatic alcohols with 1–18 carbon atoms.

3. A metal complex of a compound of Claim 1, derived from a sparingly soluble metal salt, metal hydroxide or metal oxide.

4. A metal complex of a compound of Claim 2, derived from a sparingly soluble metal salt, metal hydroxide or metal oxide.

References Cited

FOREIGN PATENTS 2,147,799  4/1972  West Germany ____ 260—112.5

OTHER REFERENCES

Studer et al.: J. Am. Chem. Soc., *82*, 1499–1501 (1960).

Meienhofer et al.: J. Am. Chem. Soc., *82*, 2279–82 (1960).

DeWied et al.: Prog. Brain Res., *32*, 213 (1970); cited from Chem. Abstr. 75:84855s.

DeWied et al.: Brit. J. Pharmacol., *45*, 118–22 (1972).

LEWIS GOTTS, Primary Examiner

R.J. SUYAT, Assistant Examiner

U.S. Cl. X.R.

424—177